Patented June 16, 1936

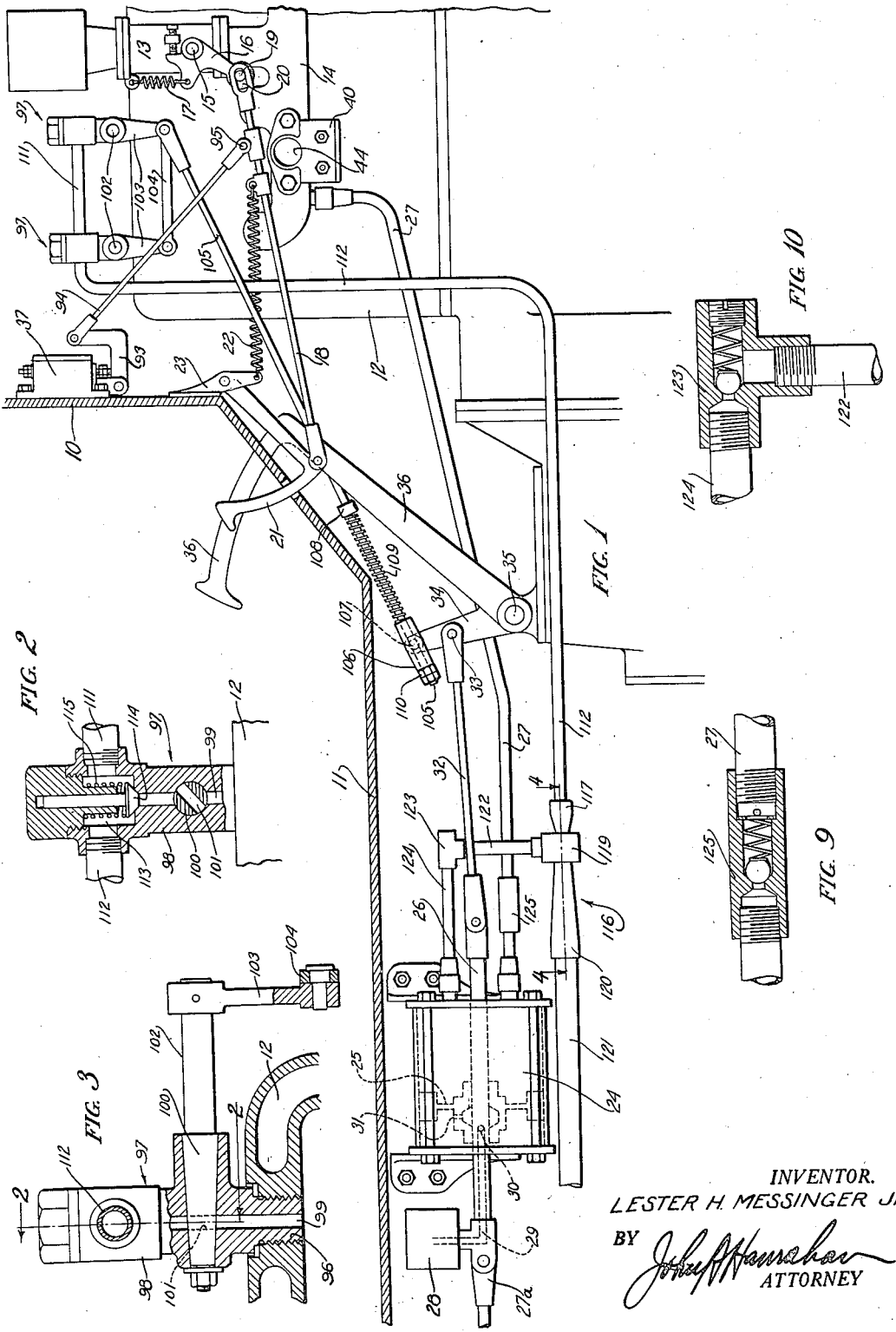

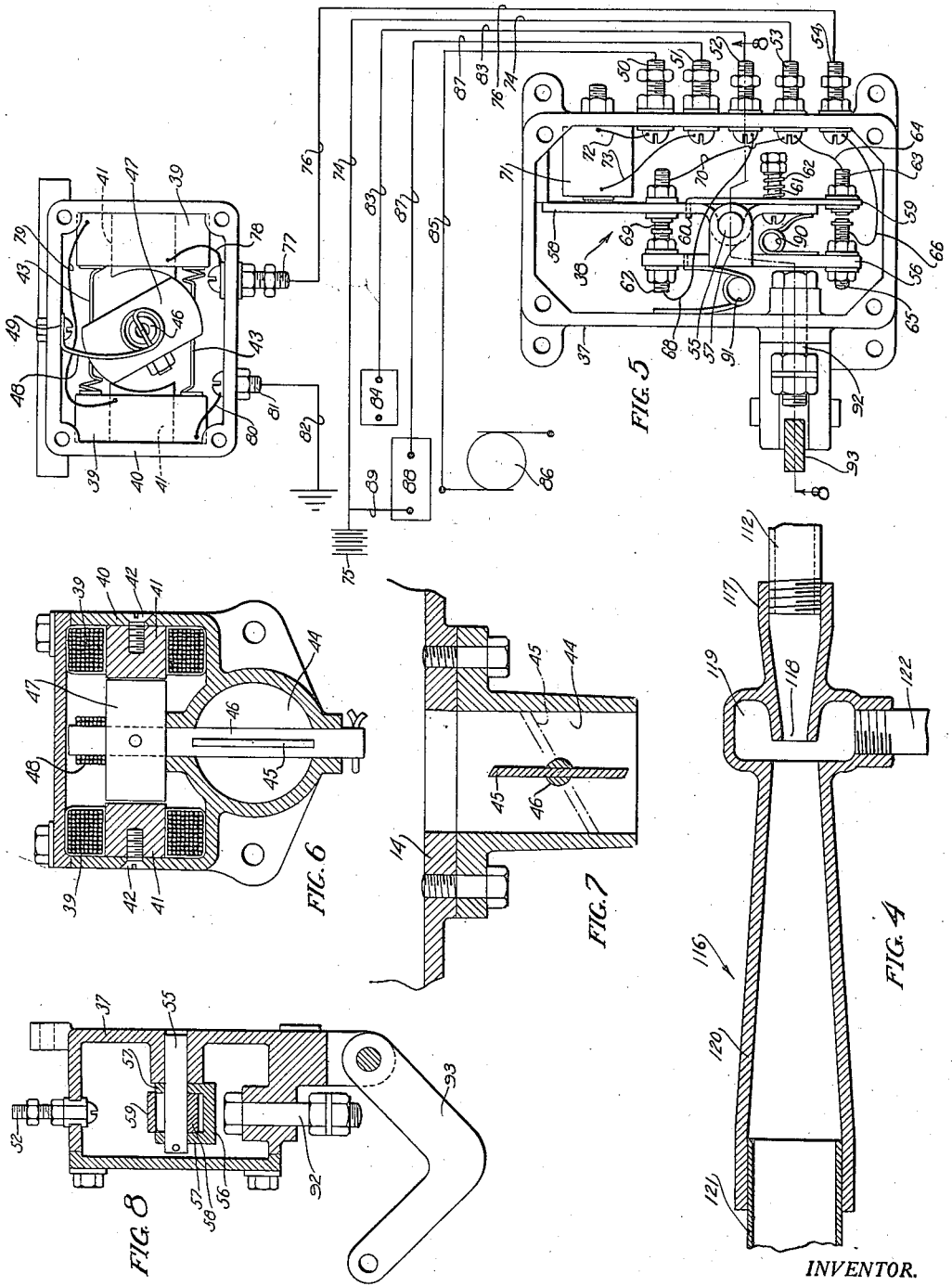

2,044,316

UNITED STATES PATENT OFFICE 2,044,316

VEHICLE BRAKING MEANS

Lester H. Messinger, Jr., Trumbull, Conn., assignor to Messinger Devices, Incorporated, Bridgeport, Conn., a corporation of Connecticut Application March 17, 1934, Serial No. 716,091

14 Claims. (Cl. 192—3)

This invention relates to new and useful improvements in automotive vehicles and has particular relation to the braking of such vehicles.

The invention comprehends the providing of means to maintain the vacuum in the cylinder of a booster brake system of an automobile when such vacuum is not maintained by the ordinary means, as for example, when the engine of the automobile is equipped with an air inlet valve means which admits air to the intake manifold of the automobile engine and destroys the vacuum therein at certain times.

Such a valve means is disclosed in my application Serial Number 653,255 of January 24, 1933.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a side elevational view illustrating one embodiment of the invention;

Fig. 2 is a vertical sectional view taken substantially along the line 2—2 of Fig. 3;

Fig. 3 is a view partly in section and partly in elevation and taken at right angles to Fig. 2;

Fig. 4 is a sectional view taken substantially along the line 4—4 of Fig. 1;

Fig. 5 is a view showing the wiring of an air valve;

Fig. 6 is a sectional view showing the solenoid for actuating said valve;

Fig. 7 is a sectional view through said air valve; and

Fig. 8 is a sectional view taken substantially along the line 8—8 of Fig. 5.

Fig. 9 is a detailed sectional view showing a check valve in the line between the cylinder of the booster brake and the intake side of the engine; and Fig. 10 is a similar view showing a check valve in a connection between the cylinder of the booster brake and an ejector.

Referring in detail to the drawings, in Fig. 1 is shown a portion of an automobile including a dash 10 and the usual floor 11 and in front of the dash there is shown a portion of a motor 12 to which the fuel is fed as from a carburetor 13 through an intake manifold 14. The supply of fuel is controlled in the usual manner by a throttle valve, the stem of which is shown at 15 connected with an operating arm 16 extending to each side of the stem and at one end connected with a spring 17, the tendency of which is to return the throttle valve to closed position when moved therefrom.

Connected with the other end of the arm 16 is a rod 18 the connection being formed as by a pin 19 on the arm and an elongated slot 20 in the end of the rod. At its rear end rod 18 is pivotally connected with an accelerator or throttle pedal 21 and a coil spring 22 is anchored at one end to the rod and at its other end to a stationary bracket 23 and serves to return the rod and accelerator pedal to their normal full line positions when moved therefrom.

Beneath the floor 11 there is located the usual braking system including a booster brake cylinder 24 of the "vacuum suspended" type and within the cylinder there is arranged a piston 25 slidable in the cylinder and provided with valve seats (not shown) for co-operation with valves (not shown) on the rod 26 which extends through the cylinder and projects beyond each of its ends. The rear end of rod 26 is connected in any suitable manner as by the means 27a to actuate the usual brakes. The construction of cylinder 24 and associated parts is old and well known in the art and is fully disclosed in Patent 1,583,117 of May 4, 1926.

A tube 27 places the cylinder 24 in communication with the intake manifold 14 so that a substantial degree of vacuum is maintained in the cylinder when the engine 12 is in operation. In the normal position of the parts the piston 25 is located in the rear portion of the cylinder 24 as shown and through an air strainer 28 air may be admitted through a passage 29 to a discharge port 30 which port is normally closed off from communication with the interior of the cylinder by means of the valves above referred to as mounted on the rod 26.

This is the usual construction and on the rod 26 being moved forwardly or toward the right in Fig. 1 one of the mentioned valves is unseated and air is permitted to enter the cylinder to the rear of the piston 25 through a passage 31 and such air being at atmospheric pressure forces the piston forwardly in the cylinder until the piston again seats against said valve when further entrance of air is prevented. In this way the piston follows the rod 26 and the movement of the latter depends of course on manual operation of the braking means so that it may be said that the piston follows the brakes. As above pointed out, this is a usual arrangement of a vacuum booster brake system.

The forward end of rod 26 has connected to it the rear end of a rod 32 the forward end of which is pivotally connected at 33 with an arm 34 secured to a rotatable shaft 35. Shaft 35 is rigid with a foot lever 36 and from Fig. 1 it will be apparent that on this brake lever 36 being depressed the rod 32 will be carried forwardly resulting in the rod 26 being shifted forwardly to bring about application of pressure to the piston 25 as above set forth.

The above mentioned air valve provides means whereby at certain times air in large quantities is admitted to the intake manifold 14 and the air is admitted in such quantities that no vacuum exists in said manifold and consequently vacuum is not maintained in the cylinder 24 by suction through the tube 27. This valve means is fully disclosed in my application above mentioned and according to the disclosure of said application a housing 37 containing a switching mechanism generally designated 38 is bolted or otherwise secured to the dash 10.

This switching mechanism amongst its other functions controls a circuit to the coils 39 of a solenoid magnet mounted within a housing 40 and the cores of said coils are designated 41 and are secured in place by screws 42. The coils may be held in place about the cores by any desired means and in Fig. 5 coil springs 43 are shown serving this purpose. Housing 40 is shown in Fig. 1 as connected with the intake manifold 14 of the engine and in its lower portion the housing includes a port 44 through which air may be admitted directly to the manifold instead of through the carburetor. Arranged in the port 44 is a valve 45 the upper portion of the stem 46 of which extends into the space between the magnet coils 39.

To the upper portion of the stem 46 there is secured an armature 47 adapted to be attracted by the electro-magnets and when so attracted adapted to turn the valve 45 shifting it to open position whereby air will be admitted through port 44 to the manifold in advance of the carburetor. A spring 48 has one of its ends anchored to the housing at 49 and has its other end portion wrapped repeatedly around and anchored in the upper portion of the valve stem and the spring is made of great length to have it exert a constant pressure and the spring tends to retain the valve 45 in closed position and to return it to such position when moved therefrom.

Mounted on the housing 37 or otherwise suitably located are five binding posts 50, 51, 52, 53 and 54 respectively. These binding posts are insulated from the housing and from one another. Within the housing is a short shaft 55 on which is pivotally mounted a plate-like member 56 having up-turned ears 57 pivotally mounting the member on the shaft. Also, pivotally mounted on the same shaft is an armature 58 off-set intermediate its ends and having such off-set portion embracing the shaft between the ears 57. A member 59 has its end 60 passed downwardly through a slot in armature 58 and extends over the shaft 55 and beyond one end of the armature. A bolt 61 passes through member 59 and said end of the armature and a spring 62 normally tends to keep member 59 against the armature but permits these parts to be pressed apart in spaced relation to the down-turned end 60 of said member.

The member 59 carries a contact element 63 connected with the binding post 53 by a wire 64 and the plate-like member 56 carries a contact element 65 connected with the binding post 54 by a wire 66. Plate-like member 56 also carries a contact member 67 connected with binding post 52 by a wire 68 and the armature 58 carries a contact member 69 connected with binding post 53 by a wire 70. Within one end portion of the housing 37 there is arranged an electro magnet 71, the coil of which is connected with the binding posts 50 and 51 by wires 72 and 73.

A lead 74 connects the binding post 53 with the positive side of a battery 75 while a lead 76 connects binding post 54 with a binding post 77 on the housing 40 and which binding post 77 is connected with one of the coils 39 by a wire 78, the coils being connected together by a wire 79 and the lead from the coils being shown at 80 and being connected with a binding post 81 from which a lead 82 extends to a ground. From binding post 52 a lead 83 extends to the ignition coil 84 of the automobile.

A lead 85 from the generator 86 is connected with the binding post 50 and a lead 87 from the binding post 51 is connected with a voltage regulator and cutout 88 and then to the battery by a lead 89 although it will be understood that the lead 87 may be connected with the battery and that a cutout may be inserted in the lead 85 in which event the voltage regulator and cutout 88 will be omitted. In some automobiles, particularly trucks and busses, the arrangement shown is used while in automobiles not equipped with a voltage regulator the cutout may be introduced in the lead 85 as above explained.

The member 56 and the armature 58 are mounted for movement together and relatively about the shaft 55. A spring 90 normally tends to move the members 56 and 58 apart and keep the contacts 63 and 65 separated. A spring 91 serves to prevent the members 56 and 58 pivoting freely about shaft 55 in a direction to bring the contact 63 into engagement with the upper wall of the housing and to prevent the contact 67 or the end of the armature coming into engagement with the lower wall of the housing.

A push rod 92 is slidable through the bottom wall of the housing 37 in alignment with, and with its inner end normally disposed in spaced relation to, the member 56. A bell-crank 93 is pivoted at the lower side of the housing 37 and to the free end of said bell-crank there is connected one end of a rod 94 and the other end of said rod is connected with rod 18 at 95.

With the arrangement described, when the throttle lever 21 is depressed the throttle valve is operated in the usual manner and the port 44 remains closed so that there is no change in the operation of the engine when the latter is operating under load. While the speed of the engine is sufficient to drive the generator at charging speed the magnet 71 is energized and attracts the armature so that the switch parts are held in the positions of Fig. 5 provided the engine is operating with advanced throttle.

In said figure contacts 67 and 69 are in engagement and the circuit is closed between the battery and the ignition means of the engine and the contacts 63 and 65 are spaced so the circuit to the coils 39 is open. Now on retarding the throttle while the engine operates above a predetermined speed the bell-crank 93 engages and moves the push rod 92 inwardly to have it engage member 56 and rock it about the shaft 55 in opposition to the spring 90. As the magnet 71 is holding the armature initial movement of member 56 will cause separation of contacts 67 and 69 to open the ignition circuit and thereafter contacts 63 and 65 are brought into engagement closing the circuit to coils 39 to have them attract the armature 47 and swing valve 45 to open position. This admits air to the manifold 14 so there will be no vacuum on the carburetor to draw fuel into the engine and port 44 being relatively large there is a free intake and exhaust of air by the engine.

On the engine dropping below the speed necessary to drive the generator at charging speed, magnet 71 will not be energized and will release the armature 58 permitting the same to move about shaft 55 in a direction to bring contact 69 into engagement with contact 67 to close the ignition circuit, and shift contact 63 away from contact 65 to open the circuit to the coils 39. When the ignition circuit is open valve 45 is open and with the parts so positioned should the throttle be advanced bell-crank 93 will be carried away from push rod 92 and the latter will move outwardly permitting the parts to return to their positions of Fig. 5. On advancing the throttle the engine is speeded up and the generator is operated at charging speed. With retarded throttle should the engine drop to idling speed or be operating slowly under load magnet 71 will not be energized and push rod 92 will cause the entire switch mechanism 38 to rock about shaft 55. When this occurs contacts 67 and 69 close the ignition circuit and contacts 63 and 65 are spaced opening the circuit to coils 39. Now valve 45 is closed and the engine idles as usual.

As above suggested when the internal combustion engine of a vehicle is operating under forced momentum, or with retarded throttle, above a predetermined speed and is equipped with the valve mechanism just described the port 44 is open and air is freely admitted to the engine and suction is not created in the tube 27 so that vacuum is not maintained in the booster brake cylinder 24. This same effect will result from the use of other types of air inlet valves for internal combustion engines and which valves open or are opened at certain times to admit air to the intake side of such engines thus partially or wholly destroying the vacuum in the intake manifolds of the engines.

When vacuum is not maintained in the cylinder 24 the booster feature of the automobile braking system is lost. According to the present invention means are provided whereby vacuum will be maintained in the cylinder 24, and the booster feature of the automobile braking system maintained in effective condition, even though suction is not maintained on said cylinder through the tube 27. As disclosed, said means takes the form of means operative on application of the vehicle brakes, to apply a suction to the booster cylinder 24.

One or more of the cylinders of the engine 12 are tapped as at 96 and into the tapped openings are threaded valves generally designated 97. Each valve 97 is a multiple valve and (see Figs. 2 and 3) each includes a body 98 to be threaded into one of the tapped openings 96 and opening through the lower end of such body is a vertical passage 99. In each instance a rotary or plug type of valve 100 extends across the passage 99 and such valve 100 has a port 101 therethrough which when the valve is in open position aligns with the passage 99 to permit of the movement of fluid therethrough. Also, each valve 100 includes a stem 102 to the outer end portion of which is rigidly secured an arm 103.

In the drawings two valves 97 are shown as entering a pair of adjacent cylinders although as the description proceeds it will be evident that this arrangement may be varied and that a greater or lesser number of valves may be employed. A link 104 has its ends pivotally connected to the free ends of the valve arms 103 whereby said arms move together. It will be obvious from an inspection of Fig. 2, wherein one of the valves 100 is shown in closed position, that but a slight rotary movement of the valve is necessary to shift it to a fully open position.

To one or the other of the valve arms 103 or to the link 104, is pivotally connected the forward end of a relatively long rod 105, on the rear portion of which is slidably mounted a member 106 to which the free end of arm 34 is pivotally connected at 107. Disposed about rod 105 between member 106 and a collar 108, rigid with said rod, is a relatively long coil spring 109 the normal tendency of which is to force member 106 rearwardly along said rod. A nut 110 is threaded on the rear end portion of the rod and is adjustable therealong to establish the normal position of the member 106 with respect to the rod and to control the tension of the spring 109.

The relationship of parts is such that on the brake lever 36 being depressed member 106 will be moved forwardly compressing the spring 109 against the collar 108 to shift the rod 105 forwardly and operate the arms 103 to rotate the valves 100 to open positions. It will be understood that the nut 110 is so adjusted that the initial movement of the arm 34, as effected by initial movement of lever 36 toward brake applying position, results in shifting of the rod 105 to open the valves 100. The purpose of this arrangement will later fully appear.

The upper portions of the valves 97 are connected by a tube 111 so that their upper portions are in communication and fluid discharged by said valves enters a relatively long tube 112 extending toward the rear of the vehicle. In its upper portion each valve 97 includes a chamber 113 adapted to communicate with and receive fluid from the passage 99 and in each case a valve 114, vertically movable but normally held on its seat by a coil spring 115, controls a communication between the passage 99 and the chamber 113. It is the chambers 113 of the valves which are placed in communication by the short pipe 111 and it is such chamber of one valve which discharges into the tube 112. However, it will be apparent that both valves might discharge into a manifold discharging into the tube 112.

In the operation of the vehicle when brake lever 36 is moved to apply the vehicle brakes the valves 100 are opened and on the compression strokes of the cylinders, into which valves 97 are threaded, the pressure of the fluid will raise valves 114 off their seats against the action of springs 115 and the fluid under pressure will be discharged or exhausted into the tube or pipe line 112. From this it will be understood that the valves 114 are pump valves and that the tapped cylinders will with their pistons act as pumps discharging through valves 97 into the line 112. This line 112 discharges into a venturi 116 comprising an inlet portion 117 tapered to provide a nozzle 118 through which tube 112 discharges. Nozzle 118 discharges into an enlarged portion 119 of the venturi and in alignment with a tapering portion 120 which at its rear enlarged end may discharge into a tube 121. This latter tube may or may not discharge into the vehicle exhaust pipe (not shown) as desired.

A suction tube 122 extends laterally from the nozzle 118 and communicates with the interior of the enlarged venturi portion 119 as shown in Fig. 4. Through a check valve 123 and a connecting tube 124 the tube 122 is placed in communication with the interior of the cylinder 24. A check valve 125 is placed in the tube 27 and the check valves 123 and 125 operate in the same manner. That is each is normally closed and the valve 123 may be drawn open by a suction in the tube 122 when the suction in said tube is greater than that in the tube 124, it being understood that the degree of vacuum in tube 124 will be the same as that within the cylinder 24. Valve 125 will be open when the degree of vacuum at its engine side is greater than that at its cylinder side.

It will now be understood that when the engine 12 is operating in the usual manner the valves 100 will be closed as will the check valve 123 and that a vacuum will be maintained in cylinder 24 due to suction through the tube 27. However, when the engine is operating with retarded throttle above a predetermined speed port 44 will be open and there will be no suction through the tube 27. When there is suction through tube 27 check valve 123 is closed so that air will not be supplied to the cylinder through tube 124 while it is being exhausted through tube 27. On depressing brake lever 36 at any time, either when the port 44 is open or otherwise, the tapped cylinders will pump into the tube 112 and such tube discharging into venturi 116 the latter will set up a suction in tube 122 to open check valve 123 and draw air from the interior of cylinder 24. During this time check valve 125 will remain closed whereby to prevent air entering the cylinder through tube 27 while it is being exhausted through tube 124.

Usually an operator uses the same foot (the right foot) for operating both the accelerator pedal 21 and the brake pedal 36. Therefore, when the brake is applied the operator's foot is removed from the accelerator pedal and the throttle is retarded due to the action of springs 17 and 22 and if the engine is operating above a predetermined speed, as it will be if the vehicle is moving at relatively great speed, the port 44 will be open. Therefore, even though the throttle is retarded the engine will be pumping a large volume of fluid in the form of air admitted through port 44 as above explained so that the tapped cylinder or cylinders will be pumping large quantities of fluid (air) through the tube 112 and venturi 116 so that a high degree of vacuum will be present in the cylinder 24 even though the suction through tube 27 has been destroyed by the opening of valve 45.

From the foregoing, it will be understood that on operation of the brake lever the ejector or venturi 116 will be operated to exhaust air from the cylinder. If the engine 12 is idling or operating with retarded throttle but a small volume of gas will be passed to the ejector to operate it. At this time the idling engine operating through tube 27 will create the necessary vacuum in the cylinder of the booster brake system. That is, the normal idling vacuum is present in the booster system. However, when valve 45 is open large quantities of practically pure air are being pumped through the ejector and it rapidly exhausts air from the cylinder 24. The invention is not limited to applications involving the type of booster brake system mentioned since it may be used with any type and will rapidly exhaust air from the booster brake system.

Having thus set forth the nature of my invention, what I claim is:

1. In combination in a motor vehicle equipped with a booster brake system including a connection with the intake side of the vehicle engine and a brake lever controlling said system, of means to apply a suction to said system independent of said connection, and means whereby said last means is placed in operation on movement of said brake lever to apply the vehicle brakes.

2. In combination in a motor vehicle equipped with a booster brake system including a connection with the intake side of the vehicle engine and a brake lever controlling said system, of means to apply a suction to said system independent of said connection, and means whereby said last means is placed in operation only on movement of said brake lever to apply the vehicle brakes.

3. In a vehicle including a booster brake system and an internal combustion engine for propelling the vehicle, said booster brake system including a cylinder and a connection between said cylinder and the intake side of said engine, a venturi, a connection between the suction side of the venturi and said cylinder, means for conveying fluid pumped from the engine to said venturi to operate the same and have it maintain a vacuum in said cylinder, valve means controlling communication between said conveying means and the engine, a movable lever controlling the vehicle brakes, and means whereby said valve means is opened and closed as said lever is moved to applied and released positions.

4. In combination in a motor vehicle equipped with a booster brake system including a connection with the intake side of the vehicle engine and a brake lever controlling said system, of means operated by the motor of said vehicle to apply a suction to said system independent of said connection, and means whereby said last means is placed in operation on movement of said brake lever toward brake applying position.

5. In a vehicle including a booster brake system and an internal combustion engine for propelling the vehicle, said booster brake system including a cylinder and a connection between said cylinder and the intake side of said engine, an ejector, a connection between the suction side of the ejector and said cylinder, means for conveying fluid pumped from the engine to said ejector to operate the same and have it maintain a vacuum in said cylinder, valve means controlling communication between said conveying means and the engine, a movable lever controlling the vehicle brakes, and means whereby said valve means is opened and closed as said lever is moved to applied and released positions.

6. In a vehicle including a booster brake system and an internal combustion engine for propelling the vehicle, said booster brake system including a cylinder and a connection between said cylinder and the intake side of said engine, an ejector, a connection between the suction side of the ejector and said cylinder, means for conveying fluid pumped from the engine to said ejector to operate the same and have it maintain a vacuum in said cylinder, valve means controlling communication between said conveying means and the engine, a movable lever controlling the vehicle brakes, means whereby said valve means is opened and closed as said lever is moved to applied and released positions, and a check valve in each of said connections whereby one is closed when the other is open.

7. In a vehicle including a booster brake system and an internal combustion engine for propelling the vehicle, said booster brake system including a cylinder and a connection between said cylinder and the intake side of said engine, means for admitting fuel free air substantially to the full capacity of the engine when the engine is operating above predetermined speed with retarded throttle whereby the engine pumps substantially fuel free air, means operated by the air pumped by the engine, and said last means serving to exhaust air from said cylinder.

8. In a vehicle including a booster brake system and an internal combustion engine for propelling the vehicle, said booster brake system including a cylinder and a connection between said cylinder and the intake side of said engine, means for admitting air to the intake side of the engine at predetermined times whereby to have the engine pump air, an ejector connected with said cylinder to exhaust air therefrom, means for conveying air pumped by the engine to said ejector to operate it, valve means controlling communication between said conveying means and the engine, a movable lever controlling the vehicle brakes, and means whereby said valve means is opened and closed as said lever is moved to apply and release the vehicle brakes.

9. In a vehicle including a booster brake system and an internal combustion engine for propelling the vehicle, said booster brake system including a cylinder and a connection between said cylinder and the intake side of said engine, means for opening the ignition circuit of the engine and for admitting fuel free air substantially to the full capacity of the engine when the engine is operating above predetermined speed with retarded throttle whereby the engine pumps substantially fuel free air, means operated by the air pumped by the engine, and said last means serving to exhaust air from said cylinder.

10. In combination in a motor vehicle equipped with a booster brake system including a connection with the intake side of the vehicle engine and a brake lever controlling said system, of means operated by the motor of said vehicle to apply a suction to said system independent of said connection, and means whereby said last means is placed in operation only on movement of said brake lever toward brake applying position.

11. In a vehicle including a booster brake system and an internal combustion engine for propelling the vehicle, said booster brake system including a cylinder and a connection between said cylinder and the intake side of said engine, means for admitting fuel free air substantially to the full capacity of the engine whereby the engine pumps only fuel free air, means operated by the air pumped by the engine, and said last means serving to exhaust air from said cylinder.

12. In a vehicle including a booster brake system and an internal combustion engine for propelling the vehicle, said booster brake system including a cylinder and a connection between said cylinder and the intake side of said engine, means for opening the ignition circuit of the engine and for admitting fuel free air substantially to the full capacity of the engine whereby the engine pumps only fuel free air, means operated by the air pumped by the engine, and said last means serving to exhaust air from said cylinder.

13. In combination in a motor vehicle equipped with a booster brake system including a connection with the intake side of the vehicle engine, means for admitting fuel free air substantially to the full capacity of the engine when the engine is operating above a predetermined speed with retarded throttle whereby the engine pumps substantially fuel free air, means operated by the air pumped by the engine, and said last means serving to apply a suction to said system independent of said connection.

14. In combination in a motor vehicle equipped with a booster brake system including a connection with the intake side of the vehicle engine, means for admitting fuel free air substantially to the full capacity of the engine whereby the engine pumps substantially fuel free air, means operated by the air pumped by the engine, and said last means serving to apply a suction to said system independent of said connection.

LESTER H. MESSINGER, JR.